(12) United States Patent
Yamazaki et al.

(10) Patent No.: US 7,288,210 B2
(45) Date of Patent: Oct. 30, 2007

(54) METHOD FOR MANUFACTURING MAGNETIC PAINT, METHOD FOR MANUFACTURING NON-MAGNETIC PAINT AND MAGNETIC RECORDING MEDIUM

(75) Inventors: Katsuhiko Yamazaki, Tokyo (JP); Tsutomu Ide, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/346,320

(22) Filed: Feb. 3, 2006

(65) Prior Publication Data

US 2006/0124887 A1 Jun. 15, 2006

Related U.S. Application Data

(62) Division of application No. 10/446,847, filed on May 29, 2003, now abandoned.

(30) Foreign Application Priority Data

May 29, 2002 (JP) .............................. 2002-155797

(51) Int. Cl.
*B01F 13/00* (2006.01)
*B02C 19/00* (2006.01)
*G11B 5/00* (2006.01)

(52) U.S. Cl. ................................ 252/62.53; 252/62.54; 241/5; 366/348; 427/128

(58) Field of Classification Search .............. 252/62.54; 241/5
See application file for complete search history.

(56) References Cited

U.S. PATENT DOCUMENTS 4,994,306 A * 2/1991 Takahashi et al. .......... 427/131
5,026,598 A * 6/1991 Koyama et al. ............ 428/323
5,064,687 A 11/1991 Matsufuji et al.
5,908,683 A 6/1999 Suzuki et al.
6,372,302 B1 * 4/2002 Kurose et al. .............. 427/548
6,541,132 B2 4/2003 Noguchi et al.
2004/0185303 A1 9/2004 Yamazaki et al.

FOREIGN PATENT DOCUMENTS

| JP | 60-211637 | 10/1985 |
|----|-----------|---------|
| JP | 64-57422 | 3/1989 |
| JP | 1-290122 | 11/1989 |
| JP | 2000-051725 | 2/2000 |
| JP | 2000-339678 | * 12/2000 |
| JP | 2001-81406 | 3/2001 |

* cited by examiner

*Primary Examiner*—C. Melissa Koslow
(74) *Attorney, Agent, or Firm*—Oblon, Spivak, McClelland, Maier & Neustadt, P.C.

(57) ABSTRACT

A method for manufacturing magnetic paint or non-magnetic paint, which can produce a magnetic recording medium having excellent surface smoothness by appropriately setting the condition of a dispersion process for improving the dispersibility of the paint, and a magnetic recording medium are provided. The magnetic paint or the non-magnetic paint is produced by performing a dispersion process of a mixed solution, in which a magnetic powder or a non-magnetic powder is mixed into a binder solution containing a binder and a solvent, with a medium dispersion device. The method includes the steps of adjusting the viscosity of the mixed solution to 1,500 cP or less on a BL type viscometer at 20 rpm basis, and performing a dispersion process with the medium dispersion device using dispersion media having an average particle diameter of 0.5 mm or less at a dispersion circumferential speed of 8 to 15 m/s.

13 Claims, 3 Drawing Sheets

METHOD FOR MANUFACTURING MAGNETIC PAINT, METHOD FOR MANUFACTURING NON-MAGNETIC PAINT AND MAGNETIC RECORDING MEDIUM

This is a divisional application of U.S. application Ser. No. 10/446,847, filed May 29, 2003, now abandoned.

BACKGROUND OF THE INVENTION

1. Field of the Invention

The present invention relates to a method for manufacturing magnetic paint, a method for manufacturing non-magnetic paint and a magnetic recording medium. In particular, the present invention relates to a method for manufacturing magnetic paint and a method for manufacturing non-magnetic paint, which can produce a magnetic recording medium having excellent surface smoothness by improving the dispersion condition during a dispersion process using a medium dispersion device, and to a magnetic recording medium using the magnetic paint and the non-magnetic paint (hereafter may be collectively, briefly referred to as "paint") produced by the respective methods.

2. Description of the Related Art

In general, magnetic paint or non-magnetic paint for manufacturing a magnetic recording medium is manufactured through, for example, steps of supplying a magnetic paint composition or a non-magnetic paint composition composed of a magnetic powder or a non-magnetic powder, a binder, an organic solvent and other necessary components into, e.g. a medium dispersion type mill, in which dispersion media, e.g. glass beads, are filled in a mixing tank, and performing forced-agitation together with the dispersion media by using an agitator built in the mixing tank.

On the other hand, regarding magnetic recording media used for videos, audio equipment, computers or the like, recording densities have been more and more increased in recent years. Consequently, there is a trend toward reduction of the minimum recording unit by reducing recording wavelengths, reducing track widths and reducing recording medium thicknesses. In order to match them, a ferromagnetic metal powder composed of fine particles having large magnetic energy is now going into use as the magnetic powder. However, the cohesion of individual particles in the magnetic powder is enhanced with a decrease in particle size or an increase in magnetic energy. As a result, in a method for manufacturing magnetic paint by using glass beads as dispersion media, there are problems in that dispersibility and surface smoothness required for achieving a high playback output of short wavelength recording and an excellent S/N ratio cannot be sufficiently attained.

In order to overcome the problems, methods using ceramic beads, e.g. zircon beads and zirconia beads, having specific gravities larger than that of glass beads as dispersion media are proposed in Japanese Unexamined Patent Application Publication No. 60-211637, Japanese Unexamined Patent Application Publication No. 64-57422, Japanese Unexamined Patent Application Publication No. 1-290122 and the like.

However, when ceramic beads having a relatively large specific gravity, in particular zirconia beads (specific gravity 6 g/cc) are used as dispersion media, there are problems in that the magnetic powder is damaged, and the electromagnetic transducing characteristic is degraded because the specific gravity is too large. In order to avoid this problem, some methods are considered in which the viscosity of the mixed solution to be subjected to a dispersion process is increased, or the agitator of the dispersion device is operated at a circumferential speed lower than that in a conventional condition. However, these methods cause problems of the applicability and the dispersibility of the paint.

On the other hand, the applicant of the present invention proposed a technology relating to a method for manufacturing magnetic paint, in which a predetermined dispersion media were used during preparation of paint, and a dispersion process performed under a predetermined condition, and to a magnetic recording medium in Japanese Unexamined Patent Application Publication No. 2001-81406. According to this technology, magnetic paint having various excellent medium characteristics, and by extension, a magnetic recording medium can be produced without causing the above-mentioned problems.

In order to achieve reduction in thickness of a magnetic recording medium in response to the above-mentioned requirement for an increase in recording density, it is important that the magnetic layer or the non-magnetic layer is formed from a thin film. However, in the technology described in the above-mentioned publication, the condition of the formation using a thin film is not sufficiently discussed. Since the surface property of the magnetic recording medium directly exerts an effect on the medium characteristics, the surface smoothness of the magnetic recording medium must be increased in order to attain excellent medium characteristics. Consequently, regarding the manufacture of the magnetic recording medium including a non-magnetic layer and a magnetic layer, each having a small thickness, a technology for achieving excellent dispersibility and for realizing a magnetic recording medium having excellent surface smoothness has been required.

SUMMARY OF THE INVENTION

Accordingly, it is an object of the present invention to provide a method for manufacturing magnetic paint and a method for manufacturing non-magnetic paint, which can produce a magnetic recording medium having excellent surface smoothness by appropriately setting a dispersion condition during preparation of the magnetic paint and the non-magnetic paint with a medium dispersion device and thereby improving the dispersibility of the paint, as well as to provide a magnetic recording medium.

In order to overcome the above-mentioned problems, a method for manufacturing magnetic paint according to an aspect of the present invention produces magnetic paint by performing a dispersion process of a mixed solution, in which a magnetic powder is mixed with a binder solution containing a binder and a solvent, with a medium dispersion device, and the method includes the steps of adjusting the viscosity of the above-mentioned mixed solution to 1,500 cP or less on a BL type viscometer at 20 rpm basis, and performing a dispersion process with the above-mentioned medium dispersion device using dispersion media having an average particle diameter of 0.5 mm or less at a dispersion circumferential speed of 8 to 15 m/s.

A method for manufacturing non-magnetic paint according to another aspect of the present invention produces non-magnetic paint by performing a dispersion process of a mixed solution, in which a non-magnetic powder is mixed with a binder solution containing a binder and a solvent, with a medium dispersion device, and the method includes the steps of adjusting the viscosity of the mixed solution to 1,500 cP or less on a BL type viscometer at 20 rpm basis, and performing a dispersion process with the above-mentioned medium dispersion device using dispersion media having an average particle diameter of 0.5 mm or less at a dispersion circumferential speed of 8 to 15 m/s.

A magnetic recording medium according to another aspect of the present invention is provided with a magnetic layer made of a coating of the magnetic paint produced by the above-mentioned manufacturing method of the present invention on a non-magnetic support.

A magnetic recording medium according to another aspect of the present invention is sequentially provided with the non-magnetic layer and the magnetic layer on a non-magnetic support, wherein the non-magnetic layer and the magnetic layer are made of coatings of the non-magnetic paint and the magnetic paint produced by the above-mentioned manufacturing methods of the present invention.

The viscosity of the paint in the present invention can be determined, for example, by using a Brookfield type viscometer (BL type), manufactured by TOKIMEC INC., and calculating the viscosity after a lapse of 1 minute at the number of revolutions of a rotor of 20 rpm. The viscosity is equal to the product of a constant and a viscometer reading, as shown by the following equation, where the constant is determined by the roller used and the number of revolutions.

$$\text{viscosity (cP)} = \text{constant} \times \text{viscometer reading} \tag{1}$$

DESCRIPTION OF THE PREFERRED EMBODIMENTS

Specific embodiments of the present invention will be described with reference to the drawings.

Figure 1:
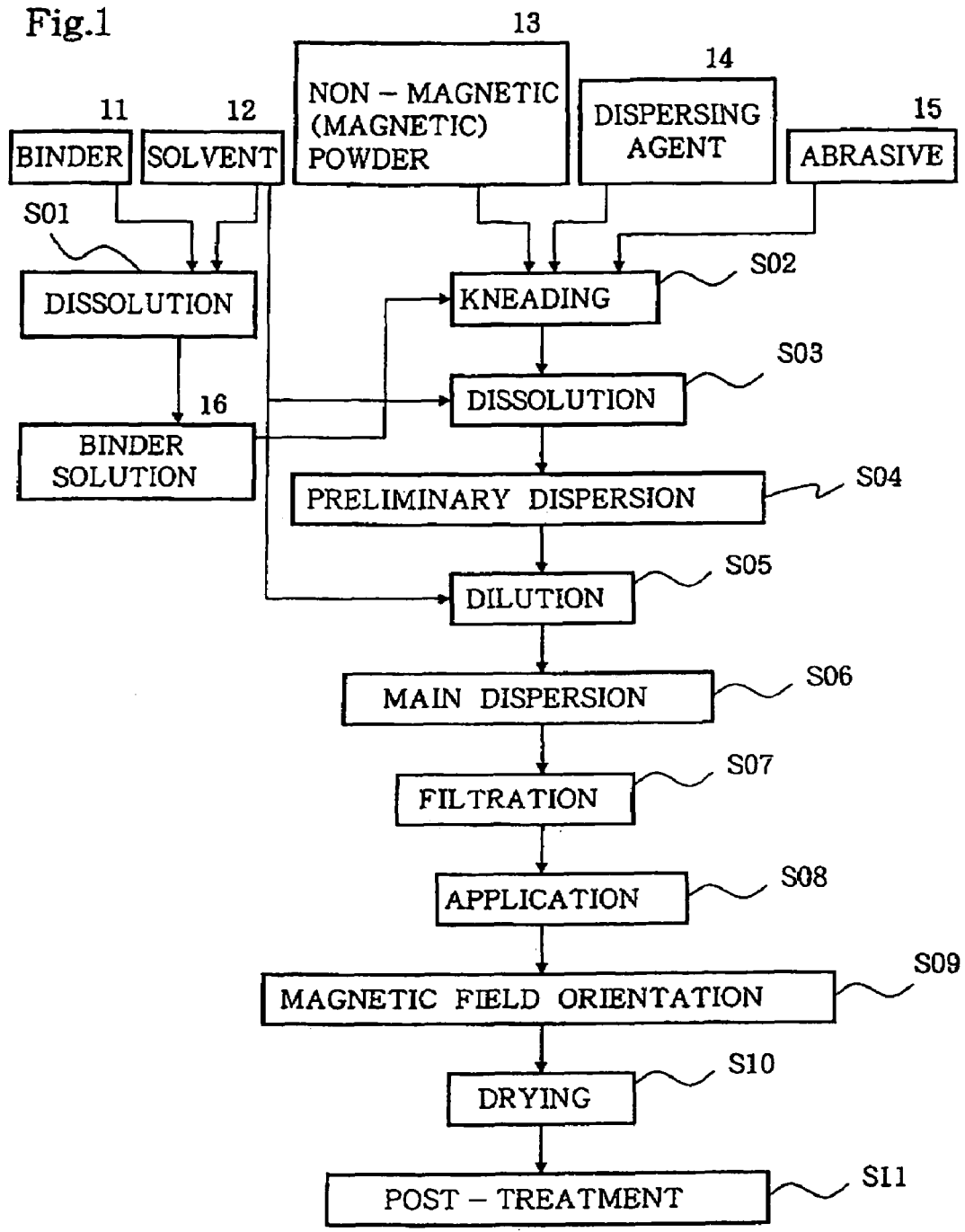
FIG. 1 is a flow chart showing an example of a process for converting a paint composition into paint in the manufacture of the paint.

As described above, each of the non-magnetic paint and the magnetic paint for the magnetic recording medium is formed from a non-magnetic powder or a magnetic powder, a binder, a solvent and other additives and the like. FIG. 1 shows a flow chart of an example of a process for converting the paint composition into paint in the manufacture of the paint.

As shown in the drawing, when the paint is manufactured, a binder 11, a solvent 12, a non-magnetic powder or a magnetic powder 13, a dispersing agent 14, an abrasive 15 and the like are sequentially mixed, and are converted into the paint through the steps of kneading, dissolution, dispersion and the like. The components of the paint according to the present invention essentially contains at least the non-magnetic powder or the magnetic powder, the binder and the solvent. The dispersing agent, the abrasive and the like can be appropriately added on an as needed basis. In the present invention, excellent dispersibility can be realized by appropriately determining the dispersion condition during a main dispersion step (S06 shown in the drawing) among the steps for conversion into the paint.

Specifically, regarding the dispersion condition of the medium dispersion device during the main dispersion step (S06), after the mixed solution is adjusted to have a viscosity $\eta 20$ of 1,500 cP or less on a BL type viscometer at 20 rpm basis, a dispersion process is performed using dispersion media having an average particle diameter of 0.5 mm or less, preferably, 0.05 to 0.3 mm, at a dispersion circumference speed v of 8 to 15 m/s, preferably, 10 to 13 m/s, and therefore, the paint is produced. When the main dispersion process is performed while this condition is satisfied, the non-magnetic powder or the magnetic powder can be excellently dispersed in the mixed solution, and excellent surface smoothness can be realized in the thin coating film formed from finally resulting low-viscosity paint. When the average particle diameter of the dispersion medium exceeds 0.5 mm, the non-magnetic powder or the magnetic powder is not sufficiently loosened to have a primary particle diameter. When the dispersion circumference speed v exceeds 15 m/s, heat release from the dispersion equipment and the paint is increased, and in addition, folding of the non-magnetic powder or the magnetic powder is likely to occur. On the other hand, when the dispersion circumference speed v is less than 8 m/s, the non-magnetic powder or the magnetic powder is unlikely to be sufficiently loosened to have a primary particle diameter. Furthermore, when the viscosity $\eta 20$ exceeds 1,500 cP, the pressure of the paint is likely to increase, and therefore, problems of the equipment occur in that the flow rate cannot be increased and the like, and in addition, the non-magnetic powder or the magnetic powder is unlikely to be sufficiently loosened to have a primary particle diameter.

Preferably, the viscosity $\eta 20$ of the above-mentioned mixed solution during the main dispersion step is adjusted to 300 cP or less when the magnetic paint is manufactured, and is adjusted to 1,000 cP or less when the non-magnetic paint is manufactured. In this manner, each paint in particular suitable for forming the magnetic layer or the non-magnetic layer can be produced, and therefore, is suitable for manufacturing a thin-layer magnetic recording medium. The residence time in the medium dispersion device during the main dispersion step for producing the paint according to the present invention may be in the order of 10 to 30 minutes, for example.

A preferred example of the method for manufacturing paint of the present invention will be specifically described step by step with reference to a flow chart shown in FIG. 1.

The binder 11 made of a resin material or the like is dissolved in the solvent 12, and therefore, a binder solution 16 is prepared (S01). The resulting binder solution 16, the non-magnetic powder or magnetic powder 13, the dispersing agent 14 and the abrasive 15 are kneaded with a kneader (S02), the solvent 12 is further added, and the resulting mixture is dissolved with a dissolver (S03). This is supplied into a vessel of a medium dispersion type mill filled in beforehand with a predetermined amount of dispersion media. An agitator which is built in the vessel and which is provided with a plurality of agitation disks, agitation blades, agitation pins or the like is rotated at a predetermined circumferential speed, and therefore, a preliminary dispersion process is performed (S04).

This preliminary dispersion process is performed in order to efficiently perform the above-mentioned dispersion process according to the present invention (main dispersion process: S06) in a short time, and is not an indispensable step in the present invention. That is, the effect of the present invention can be attained by performing the dispersion process according to the present invention immediately after the kneading (S02) and dissolution (S03). However, it is preferable to perform the preliminary dispersion process.

Since the preliminary dispersion process is performed as a pretreatment of the main dispersion process, it is essential that the non-magnetic powder or the magnetic powder can be appropriately dispersed in the mixed solution having a high viscosity (about 3,000 cP) before dilution. Consequently, the process condition thereof may be the same as the conventional dispersion condition in the case of high viscosity paint, and therefore, is not specifically limited. For example, in a manner similar to that in the main dispersion process described below, the process may be performed with a medium dispersion device using dispersion media having an average particle diameter in the order of 0.8 mm, although the diameter is larger than that in the main dispersion step according to the present invention, at a dispersion circumferential speed in the order of 8 m/s for a residence time in the order of 30 minutes.

The solvent is added to the mixed solution in which the non-magnetic powder or the magnetic powder 13 is preliminarily dispersed, as described above, and dilution is performed in order to achieve the above-mentioned viscosity η20 before the main dispersion of the present invention (S05). The main dispersion process is performed under the above-mentioned dispersion condition according to the present invention (S06), filtration is performed with a filter (S07), and therefore, the non-magnetic paint or the magnetic paint can be manufactured. Regarding the respective filtration conditions, preferably, the filtration is performed with 100%-filtration precision of 3 μm in the case of the non-magnetic paint, and with 100%-filtration precision of 1.5 μm in the case of the magnetic paint.

Regarding the procedure of formation of a non-magnetic layer or a magnetic layer by using the non-magnetic paint or the magnetic paint produced as described above, the non magnetic paint is applied on a non-magnetic support, or the magnetic paint is applied on a non-magnetic layer (S08). The magnetic paint is passed through a magnetic field while the fluidity thereof sufficiently remains, so that a magnetic field orientation process is performed for aligning the orientation of the magnetic powder (S09). Subsequently, a drying process is performed in order to bring into a solid state by evaporating the solvent (S10), and post-treatments, e.g. a calendering surface process for improving a surface property and for improving the packing condition of the magnetic powder and, in addition, a process of cutting into a desired shape in the case of the magnetic paint, and the like (S11) are performed, so that the non-magnetic layer or the magnetic layer can be formed. The above-mentioned calendering surface process can be performed by passing the magnetic recording medium between alternately arranged metal rolls and elastic rolls under the condition in which a predetermined temperature and pressure are applied.

The magnetic recording medium of the present invention can be manufactured by forming coatings of the non-magnetic layer and the magnetic layer on the non-magnetic support in accordance with the above-mentioned procedure. In order to ensure the surface smoothness of the double-layered medium, not only the surface property of the magnetic layer constituting the surface layer, but also the surface property of the non-magnetic layer constituting the layer thereunder are important. According to the present invention, since both of the magnetic layer and the non-magnetic layer can have excellent surface properties, a double-layered magnetic recording medium having extremely excellent surface smoothness can be realized. Furthermore, on an as needed basis, a back coat layer may provided on the reverse surface of the surface provided with the non-magnetic layer as the non-magnetic support and the magnetic layer.

Figure 2:
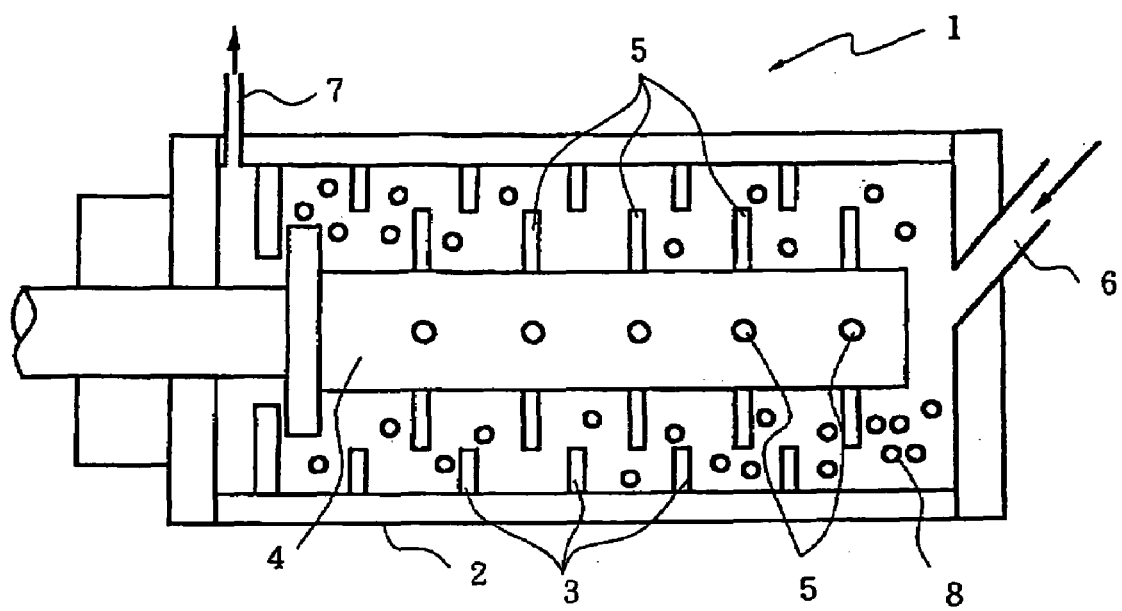
FIG. 2 is a schematic sectional view showing a pin-type mill as an example of a medium dispersion device.

Typical examples of medium dispersion devices used in the present invention include a pin-type mill and a sand mill, and the pin-type mill is preferable. FIG. 2 shows a schematic sectional view of an example of this pin-type mill. As shown in the drawing, the pin-type mill 1 as a medium dispersion device is provided with a portrait, cylindrical vessel 2 for storing the mixed solution of the paint components, a plurality of first pins 3 fixed on the inner wall surface of the vessel 2 while protruding in the radius direction, a rotating shaft 4 which is similarly provided with a plurality of protruding second pins 5 and which is driven to rotate by a motor (not shown in the drawing), an inlet 6 of the mixed solution provided on the vessel 2 and an outlet 7 of the mixed solution. When the dispersion process is performed, dispersion media (beads) 8 are filled in the vessel 2 of this pin-type mill 1, as shown in the drawing.

The second pins 5 are provided in the radius direction of the rotating shaft 4, and the second pins 5 and the first pins 3 protruding from the inner wall of the vessel 2 are alternately arranged in the rotating-shaft direction with an appropriate spacing therebetween while tip portions thereof are overlapping each other in the radius direction. These first pins 3 and the second pins 5 serve as agitation pins, and therefore, the agitator which functions by the rotation of the rotating shaft 4 is constructed. Here, the rotation speed of the tip of the second pin 5 is the dispersion circumferential speed v of this agitator, that is, the pin-type mill 1 as the medium dispersion device.

The mixed solution to be subjected to the dispersion process is supplied into the vessel 2 from the inlet 6, is passed between the fixed first pins 3 and the rotating second pins 5 while being subjected to the dispersion process with dispersion media 8 in the vessel 2 of the dispersion device, and is discharged from the outlet 7. In this case, in order to achieve sufficient dispersibility, the mixed solution discharged may be supplied again into the vessel 2 from the inlet 6 (referred to as "recycling supply"), on an as needed basis. A plurality of pin-type mills 1 may be arranged in series stages, and the mixed solution may be subjected to sequential dispersion processes with these apparatuses.

Figure 3A:
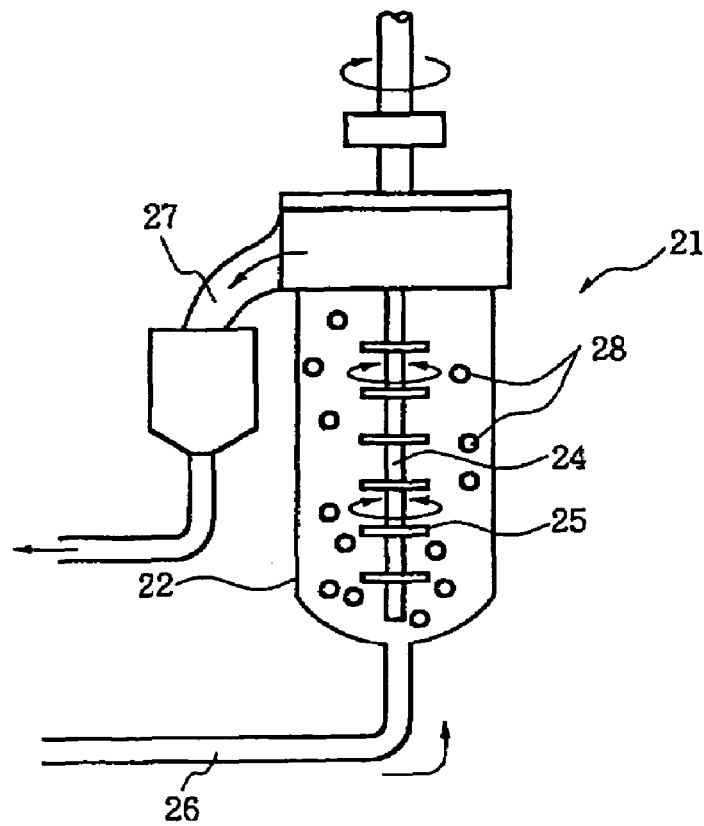
FIG. 3A is a schematic sectional view showing a sand mill as an example of a medium dispersion device.

FIG. 3A shows a schematic sectional view of a sand mill as another example of the medium dispersion device. The sand mill 21 shown in the drawing is provided with a portrait, cylindrical vessel 22 for storing the mixed solution, a rotating shaft 24 which is provided with a plurality of protruding, rotating disks 25 and which is driven to rotate by a motor (not shown in the drawing), an inlet 26 of the mixed solution provided on the vessel 22 and an outlet 27 of the mixed solution. In a manner similar to that in the pin-type mill 1, dispersion media (beads) 28 are filled in the vessel 22.

Figure 3B:
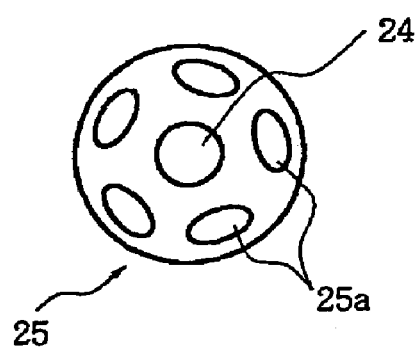
FIG. 3B is a plan view showing a rotating disk of the sand mill.

As is shown by a plan view in FIG. 3, the rotating disk 25 is constructed in the shape of a circular plate, and has a plurality of holes 25a. The mixed solution fed from the inlet 26 by a pump or the like is agitated by rotating plural disks 25 while being subjected to the dispersion process with dispersion media 28 in the vessel 22 of the dispersion device, and is discharged from the outlet 27.

The medium dispersion device may be an annular type mill or other dispersion devices including an agitator built in a mixing tank other than the above-mentioned pin-type mill and the sand mill, and is not limited. The agitator may be agitation disks, agitation blades, agitation pins or the like, as described above.

The material and other conditions of the dispersion medium are not specifically limited as long as the above-mentioned particle diameter can be satisfied. However, ceramic is preferable, and in particular, zirconia is more preferable from the viewpoint of abrasion resistance. The dispersion media for use are in the shape of beads having small diameters. Preferably, the specific gravity ρa thereof is 2.0 g/cc to 6.5 g/cc, and more preferably, is 3.8 g/cc to 6.0 g/cc.

Preferably, the filling factor of the dispersion media in the interior of the vessel of the medium dispersion device is 55% to 85%. A filling rate is defined as $100 V1/(V2+V3)$ where V1 represents an apparent volume of the dispersion media when put into the vessel, V2 represents a true volume of the dispersion media and V3 represents a volume of the mixed solution in the vessel.

In the magnetic recording medium of the present invention, specific constituent materials and the like of the magnetic recording medium are not specifically limited as long as the above-mentioned conditions with respect to the dispersion process in the process of conversion of the paint components into the paint are satisfied. However, the following materials can be used.

Examples of magnetic powders include ferromagnetic oxide powders, for example, $\gamma\text{-}Fe_2O_3$, $Fe_3O_4$, a solid solution of $\gamma\text{-}Fe_2O_3$ and $Fe_3O_4$, Co-compound-adhered $\gamma\text{-}Fe_2O_3$, Co-compound doped $\gamma\text{-}Fe_2O_3$, Co-compound-adhered $Fe_3O_4$, Co-compound-doped $Fe_3O_4$, a solid solution of Co-compound-adhered $\gamma\text{-}Fe_2O_3$ and Co-compound-adhered $Fe_3O_4$, a solid solution of Co-compound-doped $\gamma\text{-}Fe_2O_3$ and Co-compound-doped $Fe_3O_4$ and $CrO_2$, and conventionally known magnetic metal powders primarily containing Fe, Ni or Co, for example, Fe—Co—Ni alloys, Fe—Al alloys, Mn—Bi alloys, Fe—Al—P alloys, Fe—Co—Ni—Cr alloys, Fe—Ni—Zn alloys, Fe—Co—Ni—P alloys, Fe—Ni alloys, Co—Ni alloys, Co—P alloys, Fe—Mn—Zn alloys and Fe—Ni—Cr—P alloys.

Preferably, the magnetic powder is an acicular ferromagnetic metal powder having an average major axis length of 0.15 μm or less, more preferably, 0.05 to 0.10 μm. When the average major axis length exceeds 0.15 μm, it tends to be difficult to sufficiently satisfy the electromagnetic transducing characteristic (in particular S/N and C/N characteristics) required of the magnetic recording medium. A hexagonal iron oxide powder, e.g. barium ferrite, may be used. Preferably, the plate ratio of the hexagonal iron oxide powder is 2 to 7. Preferably, the average primary plate diameter determined by TEM observation is 10 to 50 nm. When this is large, the surface of the magnetic layer tends to be degraded.

It is essential that the content of the above-mentioned ferromagnetic powder in the magnetic layer composition is in the order of 70% to 90% by weight. When the content of the ferromagnetic powder is too large, the content of the binder is decreased, and thereby, the surface smoothness resulting from calendering is likely to be degraded. On the other hand, when too small, a high playback output is unlikely to be achieved.

A resin material used as the binder is not specifically limited, and conventionally known thermoplastic resins, thermosetting resins, radiation-curing resins and mixtures thereof can be preferably used. Examples thereof include, for example, vinyl chloride-epoxy copolymers, vinyl chloride-vinyl acetate copolymers, vinyl chloride-vinylidene chloride copolymers, cellulose resins, epoxy resins, polyester resins, polyurethane resins, polyvinylbutylal resins, fibrin resins and synthetic rubber resins. These are resin materials as a binder generally used for magnetic recording media.

The content of the binder resin used for the magnetic layer is 5 to 40 parts by weight relative to 100 parts by weight of the magnetic powder, and in particular, preferably is 10 to 30 parts by weight. When the content of the binder resin is too small, the strength of the magnetic layer is reduced, and thereby, running durability is likely to be degraded. On the other hand, when too large, the content of the magnetic powder is reduced, and thereby, the electromagnetic transducing characteristic becomes degraded.

Examples of cross-linking agents for curing these binder resins can include, for example, various known polyisocyanates in the case of thermosetting resins. The content of this cross-linking agent is preferably 10 to 30 parts by weight relative to 100 parts by weight of the binder resin. A dispersing agent, a lubricant, an abrasive, an antistatic agent, a curing agent and the like may be added to the magnetic layer on an as needed basis. In general, these are used by addition to magnetic paint.

Examples of organic solvents used as the solvent can include, for example, methyl ethyl ketone (MEK), methyl isobutyl ketone, toluene, cyclohexanone, ethyl acetate and tetrahydrofuran. These are suited for dissolving the resin material of the binder, and are not specifically limited. These can be used alone or as a mixture of at least two thereof. The amount of addition of the organic solvent is preferably in the order of 100 to 900 parts by weight relative to 100 parts by weight of the total amounts of the solid (a magnetic powder, various inorganic particles and the like) and the binder resin.

The thickness of the magnetic layer in the present invention is specified to be 0.50 μm or less, preferably be 0.01 to 0.50 μm, and more preferably be 0.02 to 0.30 o2m. When the magnetic layer is too thick, the self-demagnetization loss and the thickness loss are increased.

Various inorganic powders can be used as the non-magnetic powder for the non-magnetic layer. Preferable examples thereof can include acicular non-magnetic powders, for example, acicular non-magnetic iron oxide ($\alpha\text{-}Fe_2O_3$). Other various non-magnetic powders, e.g. calcium carbonate ($CaCO_3$), titanium oxide ($TiO_2$), barium sulfate ($BaSO_4$) and α-alumina ($a\text{-}Al_2O_3$) may be appropriately blended. Preferably, carbon black is used for the non-magnetic layer. Examples of such carbon black can include, for example, furnace black for rubber, thermal black for rubber, black for a color and acetylene black.

Preferably, the compounding ratio of the carbon black to the inorganic powder is 100/0 to 10/90 on a weight ratio basis. When the compounding ratio of the inorganic powder exceeds 90, a problem of surface electric resistance is likely to occur.

The resins similar to those used for the magnetic layer can be appropriately used as the binder for the non-magnetic layer, and there is no specific limitation. In a manner similar to that in the magnetic layer, other various additives, e.g. an abrasive and a dispersing agent, may be added. The non-magnetic paint can be manufactured using an organic solvent similar to that in the above-mentioned magnetic layer at the same level of amount of addition.

Preferably, the thickness of the non-magnetic layer is 2.5 μm or less, and more preferably, is 0.1 to 2.3 μm. Even when the thickness exceeds 2.5 μm, improvement of the performance cannot be expected, and furthermore, when the coating film is provided, the thickness is likely to become uneven, the condition for coating becomes severe, and the surface smoothness is likely to be degraded.

The back coat layer can be provided on an as needed basis in order to improve the running stability and to prevent charging of the magnetic layer, and therefore, is not indispensable in the present invention. Preferably the back coat layer contains 30% to 80% by weight of carbon black. Any type of conventional carbon black can be used as the above-mentioned carbon black, and the carbon black similar to that used in the above-mentioned non-magnetic layer can be used. In addition to the carbon black, non-magnetic inorganic powders, e.g. various abrasives used for the magnetic layer, dispersing agents, e.g. surfactants, higher fatty acids, fatty acid esters, silicone oil and other various additives may be added on an as needed basis.

The thickness of the back coat (after calendering) is 0.1 to 1.0 μm, and preferably, is 0.2 to 0.8 μm. When this thickness exceeds 1.0 μm, friction between a medium sliding contact path and the back coat layer becomes too large, and thereby, the running stability tends to be degraded. On the other hand, when less than 0.1 μm, shaving of the coating film of the back coat layer is likely to occur during running of the medium.

As the non-magnetic support, those made of publicly known materials, for example, polyesters, e.g. polyethylene terephthalate (PET) and polyethylene naphthalate (PEN), polyolefins, polyamide, polyimide, poly(amide-imide), polysulfone cellulose triacetate and polycarbonate, can be appropriately used. The thickness thereof and the like can be appropriately determined within the conventionally known range, and is not specifically limited.

A coating method used for the formation of the non-magnetic layer and the magnetic layer on the thin support made of the above-mentioned PET or the like by sequential application of the non-magnetic paint and the magnetic paint is not specifically limited. Examples of usable methods include an extrusion coating method, a reverse roll coating method, a gravure roll coating method, knife coater coating method, a doctor blade coating method, a kiss coat coating method, a color coat coating method and a slide bead coating method. Most of all, the extrusion coating method is in particular suited from the viewpoint of evenness in thickness of the coating film.

According to the present invention, the non-magnetic paint and the magnetic paint, which can form a magnetic recording medium having excellent smoothness, can be manufactured by improving the dispersibility of the non-magnetic powder and the magnetic powder in the non-magnetic paint and the magnetic paint for manufacturing the magnetic recording medium, and thereby, a magnetic recording medium having excellent smoothness can be produced.

EXAMPLES

The following examples are given for the purpose of illustration of this invention and are not intended as limitations thereof.

Example 1

Non-magnetic paint having the following composition was prepared using a pin-type mill shown in FIG. 2 as the medium dispersion device in accordance with the procedure described below under the dispersion condition (dispersion medium (beads) average particle diameter and dispersion circumferential speed) shown in the following Table 1, and a non-magnetic layer was formed by coating.

| <Non-magnetic paint composition for forming non-magnetic layer> | |
|---|---|
| non-magnetic powder α-$Fe_2O_3$ (manufactured by TODA KOGYO CORP., major axis length 0.11 μm, BET specific surface area 57 $m^2/g$) | 70 parts by weight |

| -continued | |
|---|---|
| <Non-magnetic paint composition for forming non-magnetic layer> | |
| carbon black R760B (manufactured by Columbian Chemicals Company, average particle diameter 30 nm, BET specific surface area 63 $m^2/g$, DBP 48 cc/100 g) | 30 parts by weight |
| electron beam (EB) curing vinyl chloride copolymer (manufactured by Toyobo Co., Ltd., TB0246, degree of polymerization 300) | 10 parts by weight |
| EB-curing polyurethane resin (manufactured by Toyobo Co., Ltd., TB0242, Mn = 25,000) | 10 parts by weight |
| phosphate(as dispersing agent) (manufactured by TOHO CHEMICAL INDUSTRY CO., LTD., RE610) | 2 parts by weight |
| α-$Al_2O_3$ (manufactured by Sumitomo Chemical Co., Ltd., HIT-60A, average particle diameter 0.2 μm) | 5 parts by weight |
| methyl ethyl ketone | 100 parts by weight |
| toluene | 100 parts by weight |
| cyclohexanone | 90 parts by weight |

The non-magnetic powder, etc., and the binder solution, which were other than a part of the organic solvent in the above-mentioned composition, were subjected to a sufficient kneading process with a kneader in a high viscosity condition. A proper amount of the organic solvent was added, and agitation was sufficiently performed with a dissolver. Subsequently, a preliminary dispersion process was performed at a dispersion circumferential speed of 8 m/s for a residence time of 30 minutes with a medium dispersion device (the pin-type mill 1 shown in FIG. 2) filled in with zirconia beads having an average particle diameter of 0.8 mm at a filling factor of 80%, while recycling supply was performed. At this time, the viscosity η20 of the mixed solution at 20 rpm was 2,000 cP. A Brookfield type viscometer (BL type) manufactured by TOKIMEC INC., was used for the measurement of this viscosity, and the viscosity (cP) after a lapse of 1 minute at the number of revolutions of a rotor of 20 rpm was calculated by the above-mentioned equation (1). The same holds true in the following description.

The resulting mixed solution was diluted by further adding the solvent, so that the viscosity was adjusted to become the desired viscosity η20 shown in the following Table 1. Subsequently, the dispersion media in the pin-type mill 1 were changed to zirconia beads having an average particle diameter of 0.3 mm, and a main dispersion process was performed at a dispersion circumferential speed of 10 m/s for a residence time of 30 minutes in a manner similar to that described above. The resulting mixed solution was subjected to a filtration process with a filter having 100%-filtration precision of 3 μm, so that non-magnetic paint was prepared. This non-magnetic paint was applied on a non-magnetic support made of PEN in order that a non-magnetic layer after drying had a thickness of 2.0 μm, followed by a drying process and a calendering surface process. Thereafter, an EB-curing process was performed, so that the non-magnetic layer was formed.

In order to evaluate the surface roughness of the resulting non-magnetic layer surface, an atomic force microscope (AFM), AutoProbe M5 manufactured by Thermo Microscopes Inc., was used, and the AFM average surface roughness Ra of this surface sample was determined under the following condition. This result is collectively shown in the following Table 1.

the number of analyses: N=3
probe: silicon single crystal probe (manufactured by NANOSENSORS)
scan mode: non-contact mode
scan area: 10×10 μm
the number of pixels: 512×512 data points
scan rate: 0.6 Hz
measurement environment: room temperature, in air
data processing: quadratic correction of the slope was performed with respect to the whole image data in both of the vertical and horizontal directions.

Examples 2 to 18 and Comparative Examples 1 to 27

Non-magnetic paint was prepared and a non-magnetic layer was formed in a manner similar to that in Example 1 except that the dispersion condition (dispersion medium (beads) average particle diameter and dispersion circumferential speed) and the viscosity η20 of the mixed solution were changed as shown in the following Table 1 and Table 2. The AFM average surface roughness Ra of the resulting surface sample was measured in a manner similar to that in Example 1. The results thereof are collectively shown in the following Table 1 and Table 2.

TABLE 1

|  | Viscosity η20 [cP] | Beads average particle diameter [mm] | Dispersion circumferential speed [m/s] | AFM average surface roughness Ra [nm] |
|---|---|---|---|---|
| Example 1 | 1000 | 0.3 | 10 | 3.7 |
| Example 2 | 1000 | 0.3 | 8 | 4.1 |
| Example 3 | 1000 | 0.3 | 15 | 3.1 |
| Comparative example 1 | 1000 | 0.3 | 7 | 4.9 |
| Comparative example 2 | 1000 | 0.3 | 16 | x |
| Example 4 | 1000 | 0.5 | 10 | 4.1 |
| Example 5 | 1000 | 0.5 | 8 | 4.4 |
| Example 6 | 1000 | 0.5 | 15 | 3.6 |
| Comparative example 3 | 1000 | 0.5 | 7 | 5.1 |
| Comparative example 4 | 1000 | 0.5 | 16 | x |
| Comparative example 5 | 1000 | 0.8 | 10 | 5.0 |
| Comparative example 6 | 1000 | 0.8 | 8 | 5.4 |
| Comparative example 7 | 1000 | 0.8 | 15 | 4.9 |
| Example 7 | 200 | 0.3 | 10 | 3.8 |
| Example 8 | 200 | 0.3 | 8 | 4.3 |
| Example 9 | 200 | 0.3 | 15 | 3.2 |
| Comparative example 8 | 200 | 0.3 | 7 | 5.1 |
| Comparative example 9 | 200 | 0.3 | 16 | x |
| Example 10 | 200 | 0.5 | 10 | 4.2 |
| Example 11 | 200 | 0.5 | 8 | 4.5 |
| Example 12 | 200 | 0.5 | 15 | 3.8 |
| Comparative example 10 | 200 | 0.5 | 7 | 5.3 |
| Comparative example 11 | 200 | 0.5 | 16 | x |
| Comparative example 12 | 200 | 0.8 | 10 | 5.3 |
| Comparative example 13 | 200 | 0.8 | 8 | 5.6 |
| Comparative example 14 | 200 | 0.8 | 15 | 5.3 |

TABLE 2

|  | Viscosity η20 [cP] | Beads average particle diameter [mm] | Dispersion circumferential speed [m/s] | AFM average surface roughness Ra [nm] |
|---|---|---|---|---|
| Example 13 | 1500 | 0.3 | 10 | 4.4 |
| Example 14 | 1500 | 0.3 | 8 | 4.6 |
| Example 15 | 1500 | 0.3 | 15 | 4.3 |
| Comparative example 15 | 1500 | 0.3 | 7 | 5.0 |
| Comparative example 16 | 1500 | 0.3 | 16 | x |
| Example 16 | 1500 | 0.5 | 10 | 4.6 |
| Example 17 | 1500 | 0.5 | 8 | 4.7 |
| Example 18 | 1500 | 0.5 | 15 | 4.5 |
| Comparative example 17 | 1500 | 0.5 | 7 | 5.5 |
| Comparative example 18 | 1500 | 0.5 | 16 | x |
| Comparative example 19 | 1500 | 0.8 | 10 | 5.7 |
| Comparative example 20 | 1500 | 0.8 | 8 | 6.0 |
| Comparative example 21 | 1500 | 0.8 | 15 | 5.5 |
| Comparative example 22 | 1600 | 0.3 | 10 | 5.4 |
| Comparative example 23 | 1600 | 0.3 | 8 | 5.9 |
| Comparative example 24 | 1600 | 0.3 | 15 | 5.0 |
| Comparative example 25 | 1600 | 0.5 | 10 | 5.5 |
| Comparative example 26 | 1600 | 0.5 | 8 | 6.0 |
| Comparative example 27 | 1600 | 0.5 | 15 | 5.1 |

Example 19

In a manner similar to that in the case of the non-magnetic paint, magnetic paint having the following composition was prepared using the pin-type mill shown in FIG. 2 as the medium dispersion device in accordance with the procedure described below under the dispersion condition (dispersion medium (beads) average particle diameter and dispersion circumferential speed) and the viscosity η20 of the mixed solution shown in the following Table 3, and a magnetic layer was formed by coating.

| <Magnetic paint composition for forming magnetic layer> | |
|---|---|
| ferromagnetic metal magnetic powder (Fe/Co/Al/Y = 100/24/5/8 (weight ratio), Hc = 146 kA/m (1,850 Oe), σs = 130 Am$^2$/kg (emu/g), average major axis length 0.10 μm) | 100 parts by weight |
| vinyl chloride-epoxy copolymer resin (manufactured by ZEON Corporation, MR110) | 8.3 parts by weight |
| polyester polyurethane resin (manufactured by Toyobo Co., Ltd., UR-8300) | 8.3 parts by weight |
| α-Al$_2$O$_3$ (manufactured by Sumitomo Chemical Co., Ltd., HIT-60A) | 10 parts by weight |
| phosphate(as dispersing agent) (manufactured by TOHO CHEMICAL INDUSTRY CO., LTD., RE610) | 2 parts by weight |
| methyl ethyl ketone | 120 parts by weight |
| toluene | 120 parts by weight |
| cyclohexanone | 90 parts by weight |

The magnetic powder, etc., and the binder solution, which were other than a part of the organic solvent in the above-mentioned composition, were subjected to a sufficient kneading process with a kneader in a high viscosity condition. A proper amount of the organic solvent was added, and agitation was sufficiently performed with a dissolver. Subsequently, a preliminary dispersion process was performed at a dispersion circumferential speed of 8 m/s for a residence time of 30 minutes with a medium dispersion device (the pin-type mill 1 shown in FIG. 2) filled in with zirconia beads having an average particle diameter of 0.8 mm at a filling factor of 80%, while recycling supply was performed. At this time, the viscosity η20 of the mixed solution at 20 rpm was 2,000 cP.

The resulting mixed solution was diluted by further adding the solvent, so that the viscosity was adjusted to become the desired viscosity η20 shown in the following Table 3. Subsequently, the dispersion media in the pin-type mill 1 were changed to zirconia beads having an average particle diameter of 0.3 mm, and a main dispersion process was performed at a dispersion circumferential speed of 10 m/s for a residence time of 30 minutes in a manner similar to that described above. The resulting mixed solution was further mixed with 3.3 parts by weight of curing agent, and was subjected to a filtration process with a filter having 100%-filtration precision of 1.5 μm, so that magnetic paint was prepared. This magnetic paint was applied on the non-magnetic layer formed in Example 1 in order that a thickness after drying became 0.17 μm, followed by a magnetic field orientation process, a drying process and a calendering surface process, so that the magnetic layer was formed.

In order to evaluate the surface roughness of the resulting magnetic layer surface, the AFM average surface roughness Ra of this surface sample was determined in a manner similar to that in the non-magnetic layer. This result is collectively shown in the following Table 3.

Furthermore, a back coat layer primarily composed of carbon black and a binder was formed by coating on the reverse surface of the surface provided with the non-magnetic layer as the PEN support and the magnetic layer. A calendering process was performed, followed by a heat-curing process, so that a magnetic recording medium was manufactured.

Examples 20 to 36 and Comparative Examples 28 to 54

Magnetic paint was prepared and a magnetic layer was formed in a manner similar to that in Example 19 except that the dispersion condition (dispersion medium (beads) average particle diameter and dispersion circumferential speed) and the viscosity η20 of the mixed solution were changed as shown in the following Table 3 and Table 4. The AFM average surface roughness Ra of the resulting surface sample was measured in a manner similar to that in Example 1. The results thereof are collectively shown in the following Table 3 and Table 4.

Each of magnetic recording media of Examples and Comparative examples was manufactured by forming a back coat layer in a manner similar to that in Example 19.

TABLE 3

| | Viscosity η20 [cP] | Beads average particle diameter [mm] | Dispersion circumferential speed [m/s] | AFM average surface roughness Ra [nm] |
|---|---|---|---|---|
| Example 19 | 1000 | 0.3 | 10 | 4.2 |
| Example 20 | 1000 | 0.3 | 8 | 4.8 |
| Example 21 | 1000 | 0.3 | 15 | 3.6 |
| Comparative example 28 | 1000 | 0.3 | 7 | 5.4 |
| Comparative example 29 | 1000 | 0.3 | 16 | x |
| Example 22 | 1000 | 0.5 | 10 | 4.6 |
| Example 23 | 1000 | 0.5 | 8 | 4.9 |
| Example 24 | 1000 | 0.5 | 15 | 3.9 |
| Comparative example 30 | 1000 | 0.5 | 7 | 5.5 |
| Comparative example 31 | 1000 | 0.5 | 16 | x |
| Comparative example 32 | 1000 | 0.8 | 10 | 5.7 |
| Comparative example 33 | 1000 | 0.8 | 8 | 6.0 |
| Comparative example 34 | 1000 | 0.8 | 15 | 5.4 |
| Example 25 | 200 | 0.3 | 10 | 4.3 |

TABLE 3-continued

| | Viscosity η20 [cP] | Beads average particle diameter [mm] | Dispersion circumferential speed [m/s] | AFM average surface roughness Ra [nm] |
|---|---|---|---|---|
| Example 26 | 200 | 0.3 | 8 | 4.9 |
| Example 27 | 200 | 0.3 | 15 | 3.6 |
| Comparative example 35 | 200 | 0.3 | 7 | 5.5 |
| Comparative example 36 | 200 | 0.3 | 16 | x |
| Example 28 | 200 | 0.5 | 10 | 4.7 |
| Example 29 | 200 | 0.5 | 8 | 5.0 |
| Example 30 | 200 | 0.5 | 15 | 4.1 |
| Comparative example 37 | 200 | 0.5 | 7 | 5.6 |
| Comparative example 38 | 200 | 0.5 | 16 | x |
| Comparative example 39 | 200 | 0.8 | 10 | 5.9 |
| Comparative example 40 | 200 | 0.8 | 8 | 6.1 |
| Comparative example 41 | 200 | 0.8 | 15 | 5.5 |

TABLE 4

| | Viscosity η20 [cP] | Beads average particle diameter [mm] | Dispersion circumferential speed [m/s] | AFM average surface roughness Ra [nm] |
|---|---|---|---|---|
| Example 31 | 1500 | 0.3 | 10 | 4.8 |
| Example 32 | 1500 | 0.3 | 8 | 5.0 |
| Example 33 | 1500 | 0.3 | 15 | 4.3 |
| Comparative example 42 | 1500 | 0.3 | 7 | 5.6 |
| Comparative example 43 | 1500 | 0.3 | 16 | x |
| Example 34 | 1500 | 0.5 | 10 | 4.9 |
| Example 35 | 1500 | 0.5 | 8 | 5.2 |
| Example 36 | 1500 | 0.5 | 15 | 4.5 |
| Comparative example 44 | 1500 | 0.5 | 7 | 5.8 |
| Comparative example 45 | 1500 | 0.5 | 16 | x |
| Comparative example 46 | 1500 | 0.8 | 10 | 6.0 |
| Comparative example 47 | 1500 | 0.8 | 8 | 6.3 |
| Comparative example 48 | 1500 | 0.8 | 15 | 5.7 |
| Comparative example 49 | 1600 | 0.3 | 10 | 5.5 |
| Comparative example 50 | 1600 | 0.3 | 8 | 5.9 |
| Comparative example 51 | 1600 | 0.3 | 15 | 5.3 |
| Comparative example 52 | 1600 | 0.5 | 10 | 5.8 |
| Comparative example 53 | 1600 | 0.5 | 8 | 6.2 |
| Comparative example 54 | 1600 | 0.5 | 15 | 5.5 |

Regarding the ATM average surface roughness Ra of the non-magnetic layer shown in the above-mentioned Table 1 and Table 2, the surface roughness is good when Ra is 4.5 nm or less, is no good when Ra is not less than 4.9, and is at an allowable level when Ra is more than 4.5, but less than 4.9. In the Tables, a symbol x represents that conversion into the paint was not able to be performed due to heat release. As is clear from the above-mentioned Table 1 and Table 2, in Examples in which the dispersion condition and the mixed solution viscosity of the present invention are satisfied, every resulting surface roughness is good or at an allowable level, whereas in Comparative examples in which the factors of the present invention are not satisfied, the results are no good or show that conversion into the paint cannot be performed.

Regarding the ATM average surface roughness Ra of the magnetic layer shown in the above-mentioned Table 3 and Table 4, the surface roughness is good when Ra is 5.0 nm or less, is no good when Ra is not less than 5.3, and is at an allowable level when Ra is more than 5.0, but less than 5.3. In the Tables, a symbol x represents a result similar to that in Table 1, etc. As is clear from the above-mentioned Table 3 and Table 4, in Examples in which the dispersion condition and the mixed solution viscosity of the present invention are satisfied, every resulting surface roughness is good or at an allowable level, whereas in Comparative examples in which the factors of the present invention are not satisfied, the results are no good or show that conversion into the paint cannot be performed. When the main dispersion step according to the present invention is performed while the mixed solution viscosity η20 is less than 200 cP, undesirably, folding of the non-magnetic powder and magnetic powder tends to occur. In the case where the non-magnetic layer is desired to have a large thickness in the order of 2 μm, unevenness in the coating is likely to occur when the viscosity is too low.

What is claimed is:

1. A method for manufacturing magnetic paint by performing a dispersion process of a mixed solution, in which a magnetic powder is mixed with a binder solution containing a binder and a solvent, with a medium dispersion device, the method comprising the steps of:

adjusting the viscosity of the mixed solution to 1,500 cP or less on a BL type viscometer at 20 rpm basis; and performing a dispersion process with the medium dispersion device using dispersion media having an average particle diameter of 0.05 to 0.3 nm at a dispersion circumferential speed of 8 to 15 m/s.

2. The method for manufacturing magnetic paint according to claim 1, wherein the viscosity is adjusted to 300 cP or less, and subsequently, the dispersion process is performed.

3. The method for manufacturing magnetic paint according to claim 1, wherein the circumferential speed is 10 to 13 m/s.

4. The method for manufacturing magnetic paint according to claim 1, wherein a preliminary dispersion process is carried out prior to said dispersion process.

5. The method for manufacturing magnetic paint according to claim 1, wherein said magnetic paint is applied on a non-magnetic layer.

6. The method for manufacturing magnetic paint according to claim 1, wherein the medium dispersion device is a pin-type mill or a plurality of pin-type mills arranged in series.

7. The method for manufacturing magnetic paint according to claim 1, wherein the medium dispersion device is a sand mill.

8. The method for manufacturing magnetic paint according to claim 1, wherein the dispersion media are zirconia beads.

9. The method for manufacturing magnetic paint according to claim 1, wherein the magnetic powder is an acicular ferromagnetic metal powder having an average major axis length of 0.15 μm or less.

10. The method for manufacturing magnetic paint according to claim 9, wherein the ferromagnetic metal powder has an average major axis length of 0.05 to 0.10 μm.

11. The method for manufacturing magnetic paint according to claim 5, wherein the magnetic paint forms a layer comprising 70% to 90% by weight of the magnetic powder, and 5 to 40 parts by weight of binder, relative to 100 parts by weight of the magnetic powder.

12. The method for manufacturing magnetic paint according to claim 11, wherein the magnetic layer has an AFM average surface roughness Ra of less than 5.3 nm.

13. The method for manufacturing magnetic paint according to claim 11, wherein the magnetic layer has an AFM average surface roughness Ra of 5.0 nm or less.

* * * * *

UNITED STATES PATENT AND TRADEMARK OFFICE
CERTIFICATE OF CORRECTION

PATENT NO. : 7,288,210 B2
APPLICATION NO. : 11/346320
DATED : October 30, 2007
INVENTOR(S) : Katsuhiko Yamazaki et al.

It is certified that error appears in the above-identified patent and that said Letters Patent is hereby corrected as shown below:

Column 8, line 27, "0.02 to 0.30 o2m" should read --0.02 to 0.30 $\mu$m--.

Column 8, line 36, "(a-Al$_2$O$_3$)" should read --($\alpha$-Al$_2$O$_3$)--.

Column 15, line 23, "0.05 to 0.3 nm" should read --0.05 to 0.3 mm--.

Signed and Sealed this

Twenty-eighth Day of October, 2008

JON W. DUDAS
*Director of the United States Patent and Trademark Office*